United States Patent
Wessel et al.

(10) Patent No.: US 8,930,742 B2
(45) Date of Patent: Jan. 6, 2015

(54) CLOCK SIGNALS FOR DYNAMIC RECONFIGURATION OF COMMUNICATION LINK BUNDLES

(75) Inventors: Robert E. Wessel, Fort Collins, CO (US); Peter D. Maroni, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 626 days.

(21) Appl. No.: 13/133,372

(22) PCT Filed: Dec. 16, 2008

(86) PCT No.: PCT/US2008/087032
§ 371 (c)(1),
(2), (4) Date: Jun. 7, 2011

(87) PCT Pub. No.: WO2010/071634
PCT Pub. Date: Jun. 24, 2010

(65) Prior Publication Data
US 2011/0246810 A1 Oct. 6, 2011

(51) Int. Cl.
G06F 1/00 (2006.01)
G06F 1/10 (2006.01)
G06F 1/04 (2006.01)

(52) U.S. Cl.
CPC ... *G06F 1/10* (2013.01); *G06F 1/04* (2013.01)
USPC ............ 713/501; 713/300; 713/400; 713/500

(58) Field of Classification Search
USPC .................................. 713/300, 400, 500, 501
See application file for complete search history.

(56) References Cited

U.S. PATENT DOCUMENTS

| | | | | |
|---|---|---|---|---|
| 5,315,181 | A * | 5/1994 | Schowe | 326/93 |
| 7,877,521 | B2 * | 1/2011 | Suzuki et al. | 710/10 |
| 8,190,944 | B2 * | 5/2012 | Senohrabek et al. | 713/500 |
| 2005/0238116 | A1 * | 10/2005 | Monta | 375/298 |
| 2006/0288249 | A1 | 12/2006 | Knepper et al. | |
| 2008/0005605 | A1 * | 1/2008 | Abe | 713/400 |
| 2008/0270818 | A1 | 10/2008 | Joordens | |

\* cited by examiner

Primary Examiner — Zahid Choudhury

(57) ABSTRACT

In at least some embodiments, an electronic device includes a processor and a memory coupled to the processor. The electronic device also includes a serial communication link controller coupled to the processor, the serial communication link controller supporting dynamic reconfiguration of a plurality of communication link bundles. The serial communication link controller receives an input clock and generates first and second clock signals based on the input clock, the first and second clock signals having different clock rates and being provided to each of a plurality of communication link bundles.

20 Claims, 4 Drawing Sheets

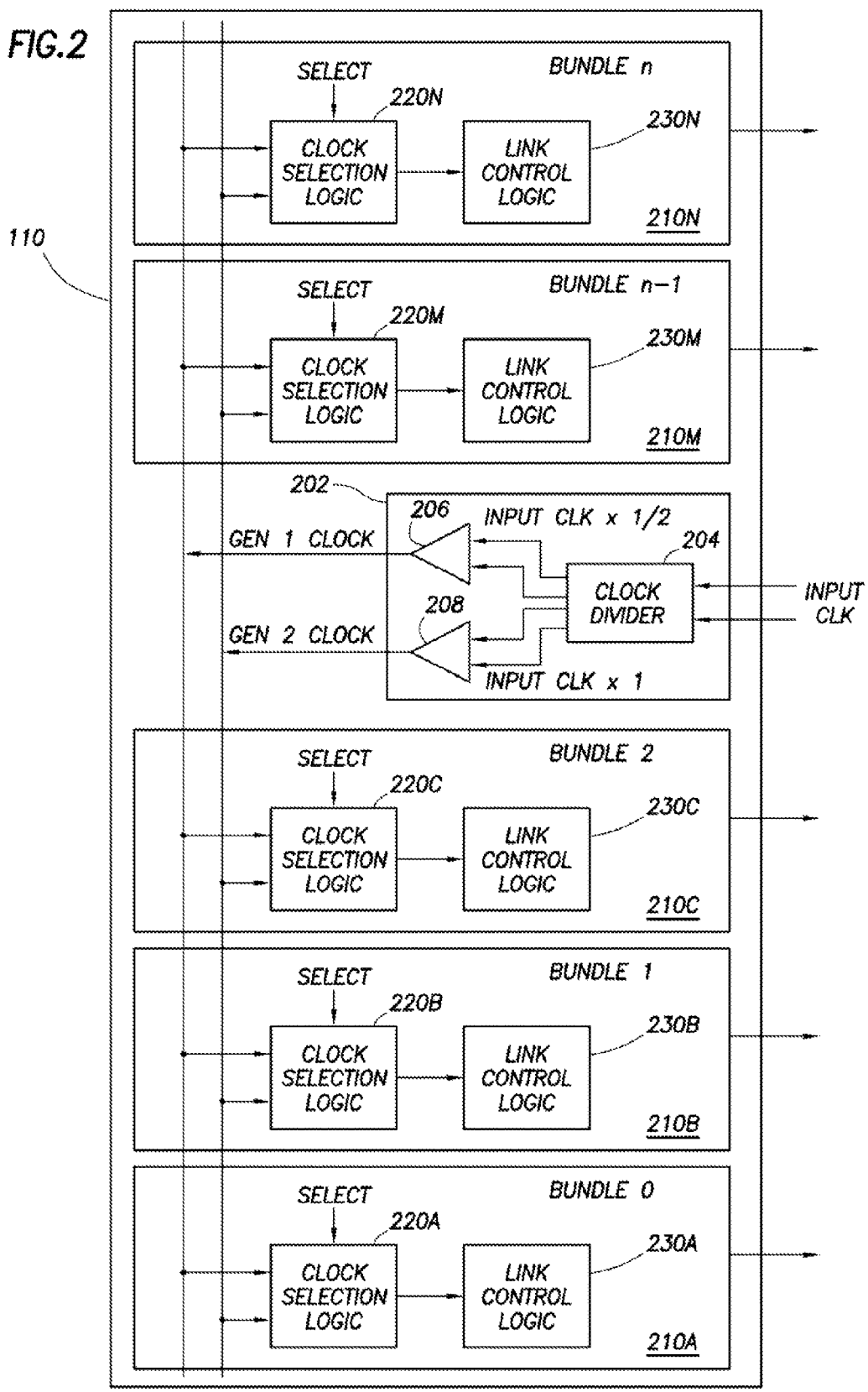

CLOCK SIGNALS FOR DYNAMIC RECONFIGURATION OF COMMUNICATION LINK BUNDLES

CROSS REFERENCE TO RELATED APPLICATION

This application is a national stage application under 35 U.S.C. §371 of PCT/US2008/087032, filed 16 Dec. 2008.

BACKGROUND

Electronic devices (e.g., computers) have many different components that communicate with each other. As technologies are developed, components and corresponding communication protocols evolve. Often, there is a need to support backwards compatibility between a previous generation of components/protocols and a next generation of components/protocols. This is because upgrading to the next generation components/protocols (or corresponding devices) is expensive and may be unnecessary for many consumers. Thus, the upgrade process occurs over time and does not necessarily involve all consumer products or components.

One example of a developing technology is the Peripheral Component Interconnect (PCI) Express architecture. PCI Express implements serial communication lanes to support high-speed communications between different computer components and/or peripherals, where the number of serial communication lanes allocated to each component/peripheral can vary (e.g., 1×, 2×, 4×, 8×, 16× and so on). The PCI Express lanes fan out from an interconnect (i.e., a switch) that enables PCI Express components to communicate with each other and also that enables PCI Express components to communicate with the host system. Different interconnects provide similar functionality as dictated by the PCI Express specification, but may vary with respect to capability (e.g., the total number of components/peripherals that can be supported, the total number of communication lanes that can be supported, the configuration of lanes, etc.).

As do many technologies, PCI Express is evolving from one generation to a next generation (Gen1 to Gen2) and there is ongoing development for future generations (Gen3) yet to be implemented. The PCI Express specification mandates that Gen2 components be compatible with Gen1 components. In part, this means that Gen2 components and links (each link has one or more lanes) need to be able to operate at a Gen2 data rate (5.0 Gbps) and at a Gen1 data rate (2.5 Gbps). Providing efficient solutions to the backwards compatibility requirements of PCI Express or other communication architectures is desirable.

BRIEF DESCRIPTION OF THE DRAWINGS

For a detailed description of exemplary embodiments of the invention, reference will now be made to the accompanying drawings in which:

FIG. 2 shows a serial communication link controller in accordance with an embodiment of the disclosure;

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the disclosure provide a mechanism for multi-clock generation, alignment, distribution, selection, and use. In accordance with at least some embodiments, the mechanism is applied to a PCI Express link controller chip. However, at least some components implemented for the multi-clock generation, alignment, distribution, and selection disclosed herein, may alternatively be provided external to the PCI Express link controller chip. Further, the mechanism described herein could be applied to other communication protocols (besides PCI Express) that would benefit from multi-clock generation, alignment, distribution, and selection. As an example, communication protocols that mandate backwards compatibility, where different clock signals are used for the previous generation and the next generation, could benefit from the disclosed multi-clock solution.

Figure 1:
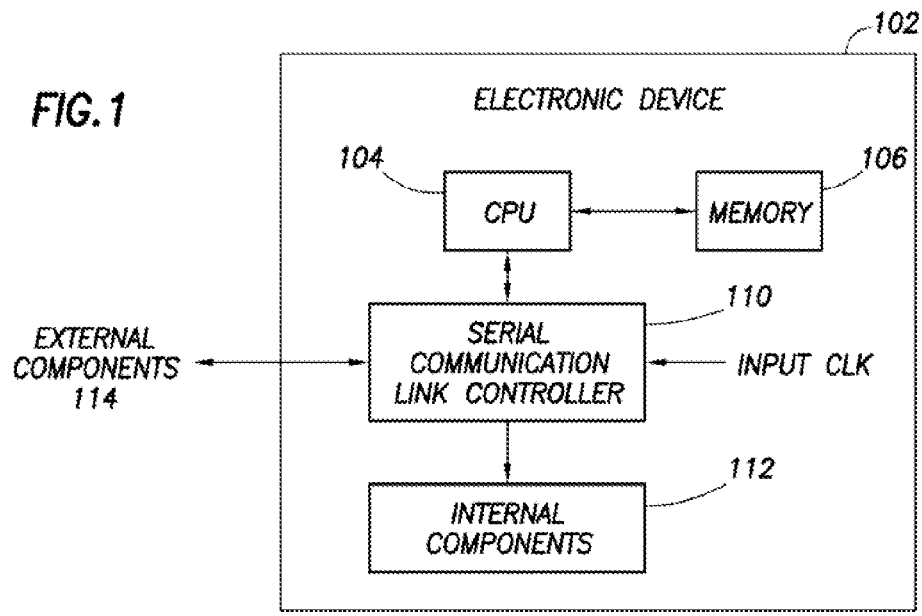
FIG. 1 shows an electronic device in accordance with an embodiment of the disclosure.

FIG. 1 shows an embodiment of an electronic device 102 in accordance with the disclosure. The electronic device 102 is representative of a desktop computer, a laptop computer, a server, a smart phone, a personal digital assistant (PDA), or other electronic devices that are now known or later developed. As shown, the electronic device 102 comprises at least one central processor unit (CPU) 104, which may correspond to at least one of a variety of semiconductor devices such as microprocessors, microcontrollers, main processing units (MPUs), digital signal processors (DSPs), advanced reduced instruction set computing (RISC) machines, ARM processors, application specific integrated circuits (ASICs), field programmable gate arrays (FPGAs) or other processing devices. The CPU 104 performs a set of predetermined operations based on data/instructions stored in or accessible to the CPU 104. In at least some embodiments, the CPU 104 couples to a memory 106 that stores data/instructions for use by the CPU 104.

The CPU 104 also couples to a serial communication link controller 110, which provides a communication interface for various internal components 112 and/or external components 114. For example, the serial communication link controller 110 may enable the internal components 112 and/or the external components 114 to communicate with each other in accordance with a predetermined communication protocol. The serial communication link controller 110 also may provide a protocol conversion function that enables the internal components 112 and/or the external components 114 to communicate with the CPU 102 or other host system components.

In accordance with some embodiments, the serial communication link controller 110 represents PCI Express 2.0 control logic or a PCI Express 2.0 chipset. In such case, the serial communication link controller 110 interconnects/manages a plurality of PCI Express communication lanes for use by the internal components 112 and/or the external components 114. The PCI Express standard currently defines a generation 1.0 (Gen1) data rate of 2.5 Gbps and a generation 2.0 (Gen2) data rate of 5.0 Gbps. The PCI Express standard also mandates that any Gen2 link (having one or more lanes) must also support Gen1 operations. In accordance with embodiments, the numerous communication lanes in a PCI Express implementation may be combined in different ways to form a plurality of links having different bandwidths.

As shown, the serial communication link controller 110 receives or has access to a single clock source ("Input Clk"). As will later be described in greater detail, this clock source is used to generate at least two separate clock signals (e.g., a Gen1 clock signal and a Gen2 clock signal). A fixed phase relationship between the two separate clock signals is maintained. Also, a low-skew clock distribution and selection scheme is implemented that enables the same logic to be used for data flow, regardless of whether a communication link operates with a first clock signal (e.g., a Gen2 clock) or a second clock signal (e.g., a Gen1 clock) and regardless of whether changes are made in the aggregation of communication lanes into links or "bundles." In accordance with at least some embodiments, the first clock signal is a buffered version of Input Clk and the second clock signal is a buffered and divided version of Input Clk. The phase alignment of the first clock signal with respect to the second clock signal is maintained even if communication lane assignments and/or link speeds change.

FIG. 2 shows an embodiment of the serial communication link controller 110 of FIG. 1 in accordance with the disclosure. As shown, the serial communication link controller 110 comprises a plurality of bundles 210A-210N. Each of the bundles 210A-210N is an aggregation of at least one communication lane and associated physical layer logic. In accordance with at least some embodiments, each of the bundles 210A-210N is able to dynamically select one of multiple clock signals to support communications or other functions. For example, in a PCI Express embodiment, each of the bundles 210A-210N is able to dynamically select a Gen1 clock signal or a Gen2 clock signal. Alternatively, once Gen3 is implemented, each of the bundles 210A-210N is able to dynamically select a Gen1 clock signal, a Gen2 clock signal, or a Gen3 clock signal. For each of the bundles 210A-210N, the selected clock signal may be provided to respective link control logic 230A-230N, where each link control logic 230A-230N supports communication functions (e.g., decoding, symbol alignment, or other functions) for its respective bundle.

As shown, the first and second clocks are distributed from a clock distribution hub 202 having a clock divider 204 and buffers 206 and 208. In accordance with some embodiments, the clock divider 204 receives an input differential clock and generates two separate output differential clocks. One of the output differential clocks passes through the buffer 206 and the other passes through the buffer 208. In some embodiments, one output differential clock may have the same frequency as the input differential clock while the other has half the frequency of the input differential clock. The clock divider 204 may additionally or alternatively support other clock frequencies based on the input clock (e.g., by dividing by a value greater than 2). This would be the case, for example, if the clock divider 204 is configured to output a Gen3 clock signal, a Gen2 clock signal and a Gen1 clock signal. Once the division and buffering steps have occurred, the clock distribution hub 202 outputs the resulting clock signals for distribution to each of the bundles 210A-210N.

Each bundle 210A-210N respectively comprises clock selection logic 220A-220N that receives the resulting clock signals and that selects one of the resulting clock signals for use with bundle communications. The selection process may be based on a separate control signal ("select") received by each clock selection logic 220A-220N. In accordance with at least some embodiments, each clock selection logic 220A-220N is able to dynamically switch between the received clock signals. Also, in some embodiments, the bundles 210A-210N are subject to dynamic re-bundling, which changes the number of lanes assigned to each bundle. Further, in some embodiments, different bundles may have multiple copies of the clock selection logic 220 so as to select multiple clock signal copies for use by the given bundle. In other words, the number of clock signal copies used by each bundle 210A-210N may vary depending on the number of communication lanes assigned or other reasons.

Figure 3:
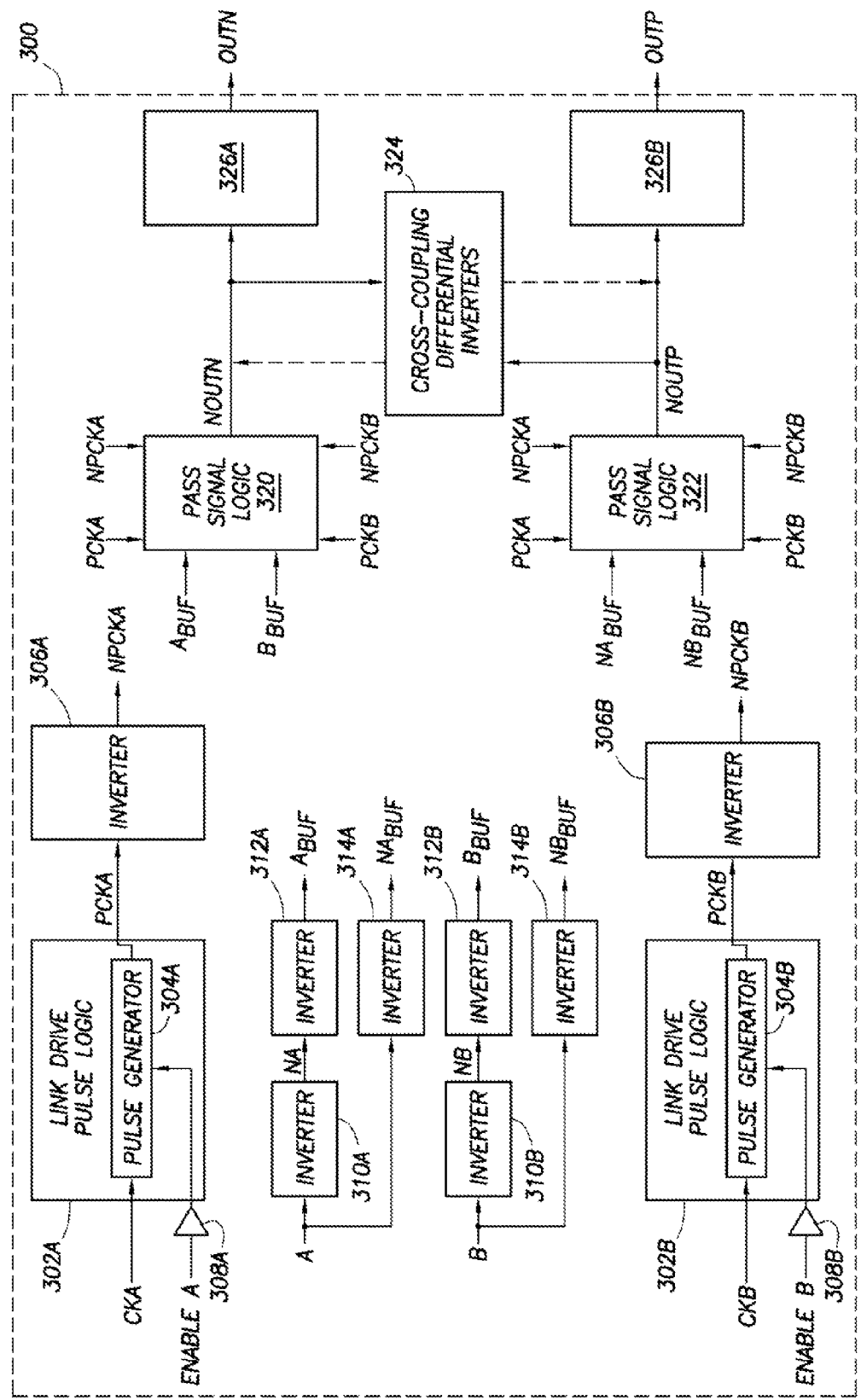
FIG. 3 shows clock divider logic in accordance with an embodiment of the disclosure.

FIG. 3 shows an embodiment of clock divider logic 300 in accordance with the disclosure. The clock divider logic 300 would be repeated for each clock signal to be output from the clock distribution hub 202. Thus, in some PCI Express embodiments, the clock divider 204 has two copies of the clock divider logic 300 (one copy of the clock divider logic 300 is used to output a Gen1 differential clock to the buffer 206 and another copy is used to output a Gen2 differential clock to the buffer 208). Alternatively, the clock divider 204 could have additional copies of the clock divider logic 300 (e.g., if Gen3 is supported). An example of generating a Gen1 differential clock and a Gen2 differential clock using copies of the clock divider logic 300 will now be given.

To generate the Gen2 differential clock, the input A is tied to a supply voltage (VDD) and the input B is tied to ground (GND). As shown, the input A is provided to an inverter 310A, which outputs NA ("not" A). As used herein, "not" refers the logical opposite (logical "highs" and "lows"). NA then passes through inverter 312A, which outputs $A_{Buf}$ (a buffered version of A). Meanwhile, A passes through inverter 314A, which outputs $NA_{Buf}$ ("not" $A_{Buf}$). Similarly, the input B is provided to an inverter 310B, which outputs NB ("not" B). NB then passes through inverter 312B, which outputs $B_{Buf}$ (a buffered version of B). Meanwhile, B passes through inverter 314B, which outputs $NB_{Buf}$ ("not" $B_{Buf}$).

In the clock divider logic 300, pulse-based signals (PCKA, NPCKA) are provided by inputting a clock signal (CKA) to link drive pulse logic 302A having a pulse generator 304A. As shown, an enable signal ("Enable A") is passed through a buffer 308A and on to the pulse generator 304A to selectively enable pulse generation. The output of the pulse generator 304A is a pulsed version of CKA ("PCKA"). For example, PCKA may comprise a pulse for each rising clock edge of CKA. PCKA is provided to an inverter 306A, which outputs NPCKA ("not" PCKA).

Similarly, additional pulse-based signals (PCKB, NPCKB) are provided by inputting a clock signal (CKB) to link drive pulse logic 302 6 having a pulse generator 304B. As shown, an enable signal ("Enable B") is passed through a buffer 308B and on to the pulse generator 304B to selectively enable pulse generation. The output of the pulse generator 304B is a pulsed version of CKB ("PCKB"). For example, PCKB may comprise a pulse for each rising clock edge of CKB. PCKB is provided to an inverter 306B, which outputs NPCKB ("not" PCKB). In accordance with some embodiments, CKA and CKB are obtained from a differential Gen2 clock input to the clock divider 204. In alternative embodiments, CKA and CKB could be a Gen3 clock input or another highest speed clock signal in a configuration.

As shown, the clock divider logic 300 also comprises pass signal logic 320 and 322 that corresponds to a pass signal gate topology. The pass signal logic 320 receives $A_{Buf}$ and $B_{Buf}$ as inputs and passes one of these signals based on the pulsed signals (PCKA, NPCKA, PCKB, NPCKB). Similarly, the pass signal logic 322 receives $NA_{Buf}$ and $NB_{Buf}$ as inputs and passes one of these signals based on the pulsed signals (PCKA, NPCKA, PCKB, NPCKB). The pass signal logic 320 provides its output (NOUTN) to an inverter 326A, which outputs OUTN from the clock divider logic 300. Meanwhile, the pass signal logic 322 provides its output (NOUTP) to an inverter 326B, which outputs OUTB from the clock divider logic 300. As shown in FIG. 3, cross-coupling differential inverters 324 are placed between the outputs of the pass signal logic 320 and 322 to ensure a differential clock output. In the example provided, the OUTN and OUTP from the clock divider logic 300 may correspond to a Gen2 differential clock that is output from the clock divider 204 of FIG. 2 and is provided to the buffer 208.

As previously mentioned, another copy of the clock divider logic 300 can be used to output a Gen1 differential clock to the buffer 206. In such case, the input A is tied to supply voltage (VDD) and the input B is tied to ground (GND), but the polarity of A and B are switched every other clock cycle (assuming the clock cycles of a Gen2 input clock).

Using copies of the clock divider logic 300, the clock divider 204 is able to receive a single input clock and create at least two separate clock signals from the input clock, where one of the clock signals is one half the frequency of the other clock signal. In at least some embodiments, the input clock corresponds to the output of a transmit phase-locked loop (PLL) that is part of a PCI Express 2.0 chipset. The clock divider logic 300 edge-aligns the two separate clock signals to within a narrow (or tight) tolerance. For example, in some embodiments, the falling edge of one of the clock signals never precedes nor trails the falling edge of the other clock signal by more than 10 picoseconds. These edge-aligned clock signals are distributed to the communication link bundles, where one of the clock signals is selected for each given communication lane based on the each lane's bundle assignment (sometimes referred to as "bifurcation") and data-rate characteristics.

The combination of tightly aligned clock signals and a low-skew distribution and selection scheme enables the distribution of both clock signals to the entire PCI Express control logic (i.e., to every point that uses the clock signals) with a low clock skew (e.g., 100 picoseconds). In accordance with some embodiments, the edge-alignment, distribution, and selection scheme enable a single instantiation of all the PCI Express control logic. Also, pre-existing logic signals can be used to select which of the at least two clock signals output from the clock distribution hub 202 is used for each communication link bundle.

By creating separate clock signals having a precise and invariant edge-alignment to each other, switching between the two clock signals (on transition from one data rate to the other) can occur without creating glitches (small pulses that can cause electrical malfunctions). In accordance with at least some embodiments, switching between the two clock signals occurs when the clock signals have the same voltage level (e.g., both are "high").

Figure 4:
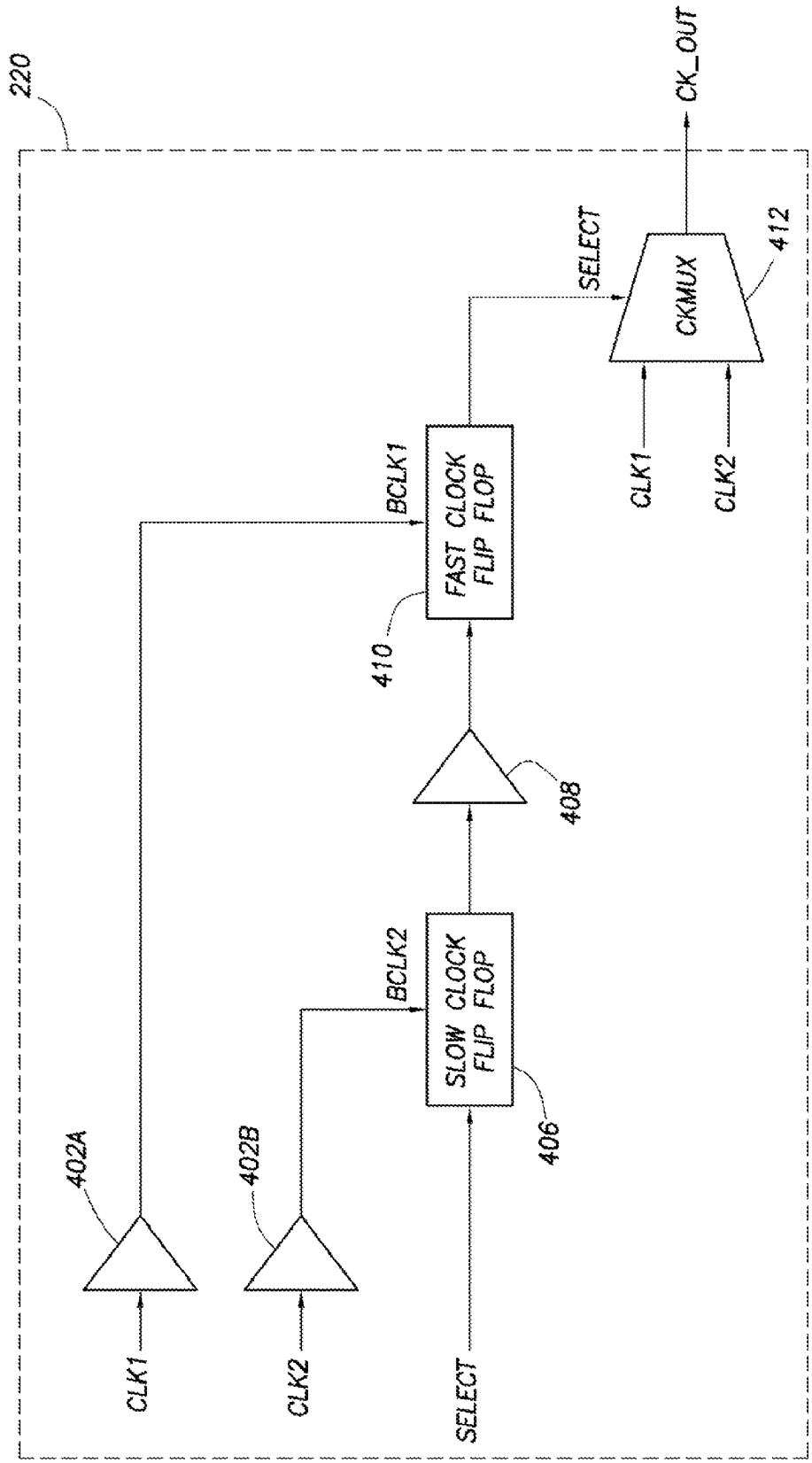
FIG. 4 shows clock selection logic in accordance with an embodiment of the disclosure.

FIG. 4 shows an embodiment of the clock selection logic 220 of FIG. 2 in accordance with the disclosure. As shown, the clock selection logic 220 may comprise a multiplexer 412 that receives multiple clock signals ("clk1" and "clk2") from the clock distribution hub 202. In alternative embodiments, the multiplexer 412 selects from three or more clock signals having different clock rates. In at least some embodiments, clk1 has a higher frequency that clk2 (e.g., clk1 may correspond to a Gen2 clock and clk2 may correspond to a Gen1 clock).

The control signal ("sel") for the multiplexer propagates through a flip flop chain that includes flip flop 406 in series with flip flop 410. This flip flop chain may be referred to as "glitch control logic." In at least some embodiments, the flip flop 406 corresponds to a "slow clock flip flop" because it is clocked by clk2 and the flip flop 410 corresponds to a "fast clock flip flop" because it is clocked by clk1. In operation, the output state of the flip flops 406 and 410 change on the rising edge of their respective input clocks. Accordingly, the flip flop 406 propagates any changes to a corresponding control signal ("select") on the rising edge of clk2 (the slower clock signal). The output of flip flop 406 is buffered by buffer 408 and is then input to flip flop 410, which propagates any changes to the control signal on the rising edge of clk1 (the faster clock signal). Thus, any changes to the control signal of the multiplexer 412 will only be received by the multiplexer 412 when clk1 and clk2 are at the same voltage level (a logical "high"). In this manner, glitches due to switching between clk1 and clk2 are prevented.

Figure 5:
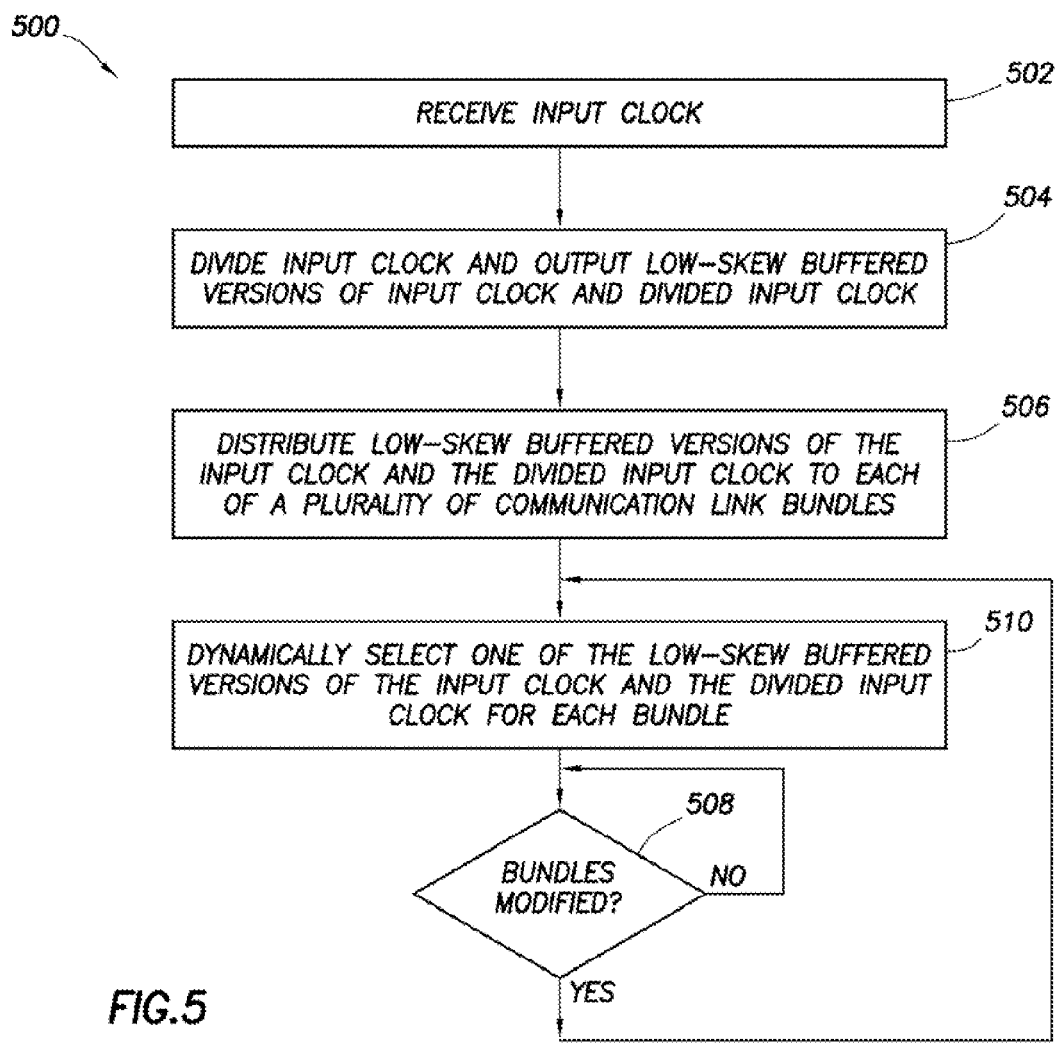
FIG. 5 shows a method in accordance with an embodiment of the disclosure.

FIG. 5 shows a method 500 in accordance with embodiments of the disclosure. The method 500 comprises receiving an input clock (block 502). At block 504, the input clock is divided and low-skew, buffered versions of the input clock and the divided input clock are output. At block 506, the low-skew, buffered versions of the input clock and the divided input clock are provided to each of a plurality of communication link bundles. The method 500 further comprises dynamically selecting one of the low-skew, buffered versions of the input clock and the divided input clock for each bundle (block 510). If the bundles are modified (determination block 508), the method 500 returns to block 510. The method 500 may alternatively include additional or fewer steps.

For example, in at least some embodiments, the method 500 may comprise maintaining an edge-alignment of the first and second clock signal using a pass signal gate topology. Also, the method 500 may comprise dynamically selecting one of the low-skew, buffered versions of the input clock and the divided input clock for each bundle by causing switches between the first and second clock signals to occur when both the first and second clock signals are asserted.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:
1. A electronic device, comprising:
a processor;
a memory coupled to the processor;

a plurality of communication link bundles comprising a first communication link bundle using a first clock signal and a second communication link bundle using a second clock signal; and a serial communication link controller coupled to the processor, the serial communication link controller supporting dynamic reconfiguration of the plurality of communication link bundles, the serial communication link controller to receive an input clock and generates the first and second clock signals based on the input clock, the first and second clock signals having different clock rates.

2. The electronic device of claim 1 wherein the first clock signal is a buffered version of the input clock and the second clock signal is a buffered and divided version of the input clock.

3. The electronic device of claim 1 wherein the first clock signal supports a data rate of 5.0 Gbps and the second clock signal supports a data rate of 2.5 Gbps.

4. The electronic device of claim 1 wherein the serial communication link controller is compatible with PCI Express.

5. The electronic device of claim 1 wherein phase alignment of the first clock signal with respect to the second clock signal is maintained even if said communication link bundles are reconfigured.

6. The electronic device of claim 1 wherein at least one bundle of the plurality of communication link bundles comprises a plurality of communication lanes.

7. The electronic device of claim 6 wherein the first communication link bundle is to connect the processor to a first plurality of components at a first data rate, and the second communication link bundle is to connect the processor to a second plurality of components at a second data rate.

8. The electronic device of claim 1 wherein the dynamic reconfiguration of the plurality of communication link bundles comprises transferring a first communication lane from the first communication link bundle to the second communication link bundle.

9. Serial communication link logic, comprising:
a clock divider that receives an input clock and generates first and second clock signals based on the input clock, the first and second clock signals having different clock rates; and a plurality of reconfigurable communication link bundles, wherein each bundle has clock selection logic that receives the first and second clock signals from the clock divider and that dynamically selects either the first clock signal or the second clock signal for use by the bundle.

10. The serial communication link logic of claim 9 wherein the clock divider maintains an edge-alignment of the first and second clock signals to within 10 picoseconds.

11. The serial communication link logic of claim 9 wherein the clock divider comprises a pass signal gate topology.

12. The serial communication link logic of claim 9 wherein each clock selection logic comprises glitch control logic for preventing glitches when switching between the first and second clocks signals.

13. The serial communication link logic of claim 12 wherein the glitch control logic comprises a flip flop chain that propagates a control signal for switching between the first and second clock signals, the flip flop chain having a first flip flop clocked by the second clock signal in series with a second flip flop clocked by the first clock signal, wherein the second clock signal has a slower clock rate than the first clock signal.

14. The serial communication link logic of claim 9 further comprising at least one bundle having a plurality of multiplexers that receive and select multiple distributed copies of the first clock signal or the second clock signal to control physical layer data flow.

15. The serial communication link logic of claim 9 wherein at least one bundle of the plurality of reconfigurable communication link bundles comprises a plurality of communication lanes.

16. A method, comprising:
receiving an input clock;
dividing the input clock and outputting low-skew and buffered versions of the input clock and the divided input clock;
distributing the low-skew buffered versions of the input clock and the divided input clock to each of a plurality of reconfigurable communication link bundles; and
dynamically selecting the low-skew buffered version of the input clock or the low-skew buffered version of the divided input clock for each bundle.

17. The method of claim 16 further comprising selectively modifying the number of communication lanes assigned to at least some of said bundles.

18. The method of claim 16 further comprising maintaining an edge-alignment of the first and second clock signals based on a pass signal gate topology.

19. The method of claim 16 wherein dynamically selecting one of the low-skew buffered versions of the input clock and the divided input clock for each bundle comprises causing switches between the first and second clock signals to occur when both the first and second clock signals are asserted.

20. The method of claim 16 wherein at least one bundle of the plurality of reconfigurable communication link bundles comprises a plurality of communication lanes.

* * * * *